(12) United States Patent
Fuller et al.

(10) Patent No.: US 10,125,682 B2
(45) Date of Patent: Nov. 13, 2018

(54) METHODS AND APPARATUS FOR MEASURING AXIAL SHAFT DISPLACEMENT WITHIN GAS TURBINE ENGINES

(71) Applicant: Rolls-Royce Corporation, Indianapolis, IN (US)

(72) Inventors: Kenneth A. Fuller, Camby, IN (US); Christopher E. LaMaster, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 726 days.

(21) Appl. No.: 14/190,609

(22) Filed: Feb. 26, 2014

(65) Prior Publication Data

US 2014/0241852 A1   Aug. 28, 2014

Related U.S. Application Data

(60) Provisional application No. 61/769,527, filed on Feb. 26, 2013.

(51) Int. Cl.
*F02C 7/00* (2006.01)
*F01D 21/00* (2006.01)
(Continued)

(52) U.S. Cl.
CPC .............. *F02C 7/00* (2013.01); *F01D 21/003* (2013.01); *F01D 21/04* (2013.01);
(Continued)

(58) Field of Classification Search
CPC ........... G01B 7/14; G01B 7/023; F01D 21/04; F01D 2270/821
(Continued)

(56) References Cited

U.S. PATENT DOCUMENTS 3,208,269 A   9/1965 Eccles et al.
3,861,818 A   1/1975 Eggenberger
(Continued)

FOREIGN PATENT DOCUMENTS

BE     649204 A    10/1964
EP     1918679 A2   5/2008
(Continued)

OTHER PUBLICATIONS

International Search Report and Written Opinion, International Application No. PCT/US2014/018588, search completed May 19, 2014, 10 pages.
(Continued)

*Primary Examiner* — Reena Aurora
(74) *Attorney, Agent, or Firm* — Barnes & Thornburg LLP

(57) ABSTRACT

In some embodiments, an apparatus includes a target member, a sensor and a mounting assembly. The target member is coupled to a shaft that is disposed within an engine housing and that rotates about an axis. The target member includes a target surface that is substantially normal to the axis of rotation of the shaft. The sensor is configured to produce a signal associated with a distance between a sensor tip and the target surface. The mounting assembly is coupled to the sensor and the engine housing, and is configured to adjust the distance between the sensor and the target surface.

17 Claims, 11 Drawing Sheets

(51) Int. Cl.
*F01D 21/04* (2006.01)
*G01B 7/14* (2006.01)
*G01B 7/02* (2006.01)

(52) U.S. Cl.
CPC ........ *F05D 2270/821* (2013.01); *G01B 7/023* (2013.01); *G01B 7/14* (2013.01)

(58) Field of Classification Search
USPC .................................................. 324/207.26
See application file for complete search history.

(56) References Cited

U.S. PATENT DOCUMENTS

| | | |
|---|---|---|
| 4,073,184 A | 2/1978 | Collins |
| 4,737,709 A | 4/1988 | Loftus |
| 4,774,465 A | 9/1988 | Nilius |
| 4,833,405 A | 5/1989 | Richards et al. |
| 5,214,278 A | 5/1993 | Banda |
| 5,748,111 A | 5/1998 | Bates |
| 6,222,360 B1 | 4/2001 | Tischer et al. |
| 6,609,424 B2 * | 8/2003 | Colarelli, III ......... G01M 1/225 73/460 |
| 7,116,097 B2 | 10/2006 | Revankar et al. |
| 7,191,943 B2 | 3/2007 | Sewell et al. |
| 7,215,129 B1 * | 5/2007 | Andarawis ............ F01D 21/003 324/661 |
| 7,242,182 B2 | 7/2007 | Finkler et al. |
| 7,545,518 B2 | 6/2009 | Heyworth |
| 7,757,606 B2 | 7/2010 | Baintner et al. |
| 8,352,149 B2 | 1/2013 | Meacham |
| 2002/0033052 A1 | 3/2002 | Kondo et al. |
| 2012/0107094 A1 | 5/2012 | Lillis |

FOREIGN PATENT DOCUMENTS

| | | |
|---|---|---|
| EP | 2551451 A1 | 1/2013 |
| WO | 2012110756 A1 | 8/2012 |

OTHER PUBLICATIONS

Alexander A. Kirpichev et al., "Eddy probe system on the basis of new technology", 17th World Conference on Nondestructive Testing, Oct. 25-28, 2008, Shanghai, China.

* cited by examiner

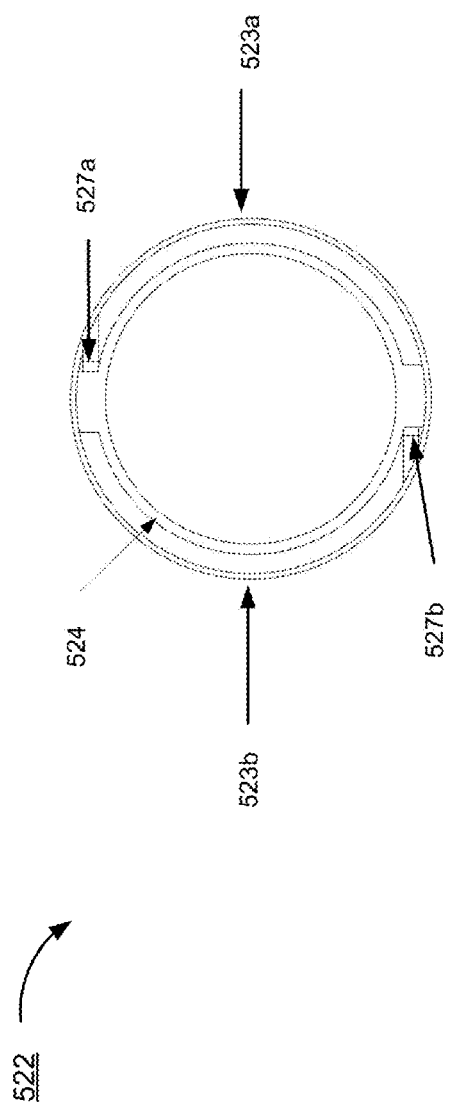
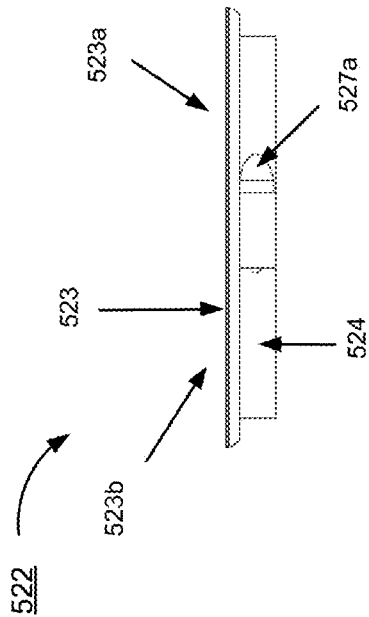
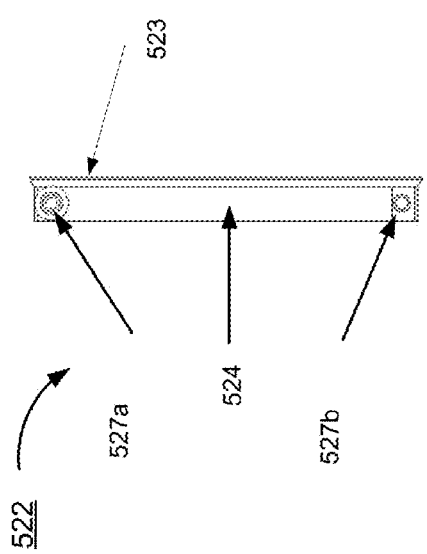
FIG. 5B
FIG. 5D
FIG. 5C

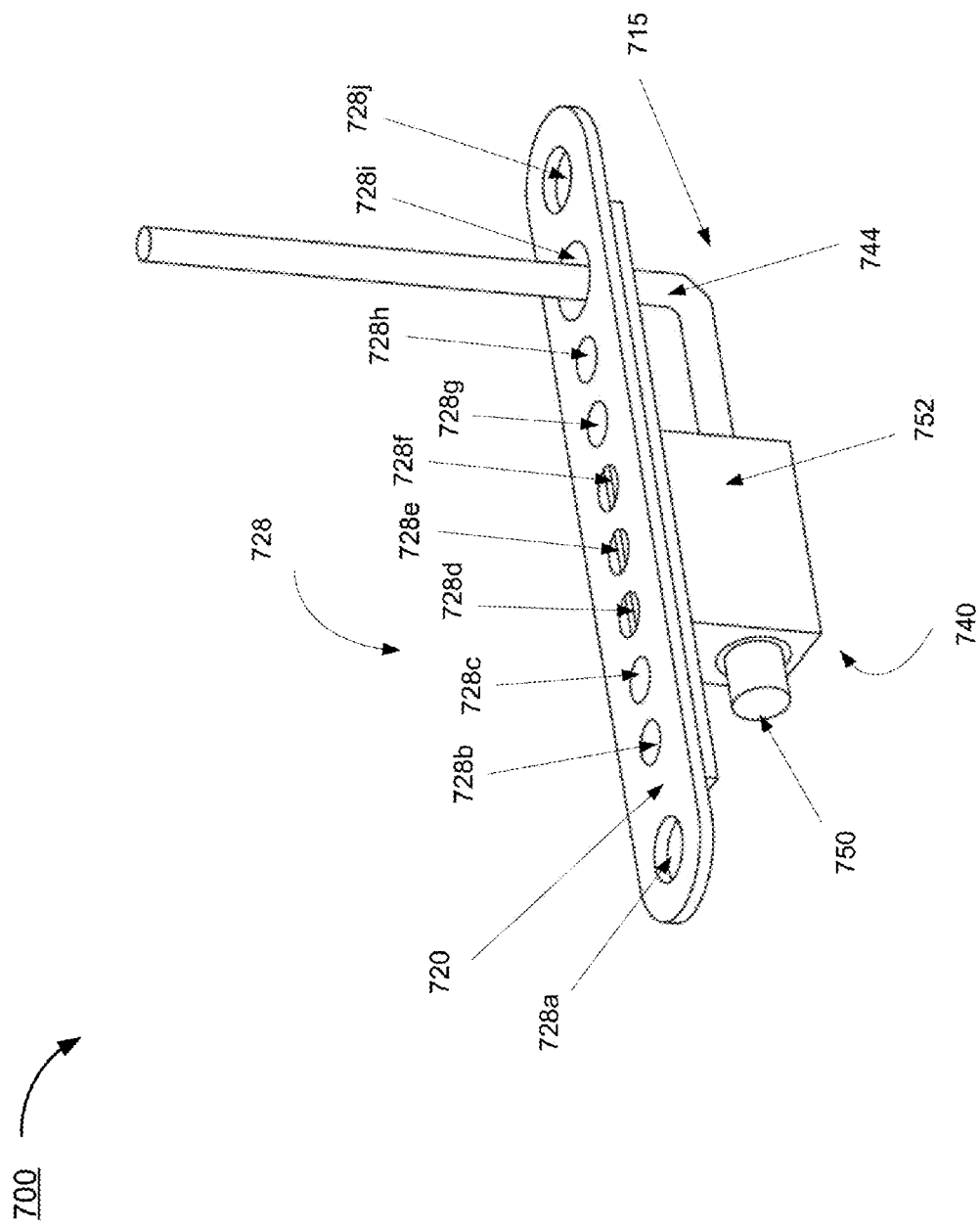

900

```
┌─────────────────────────────────────────────────────────────┐
│ Dispose, a target member about a shaft of an engine such that│
│ the target surface of the target member is substantially normal│
│          to an axis of rotation of the shaft                │
│                          902                                │
└─────────────────────────────────────────────────────────────┘
                              │
                              ▼
┌─────────────────────────────────────────────────────────────┐
│  Couple, a sensor to the engine housing, where the sensor   │
│  produces a signal associated with a distance between the   │
│            sensor tip and the target surface                │
│                          904                                │
└─────────────────────────────────────────────────────────────┘
                              │
                              ▼
┌─────────────────────────────────────────────────────────────┐
│   Adjust, a position of the sensor to change the distance   │
│        between the sensor tip and the target surface        │
│                          906                                │
└─────────────────────────────────────────────────────────────┘
```

METHODS AND APPARATUS FOR MEASURING AXIAL SHAFT DISPLACEMENT WITHIN GAS TURBINE ENGINES

CROSS-REFERENCE TO RELATED APPLICATIONS

This application claims priority to U.S. Provisional Application Ser. No. 61/769,527, entitled "Method for Measuring Axial Shaft Displacement with an Eddy Current Sensor," filed Feb. 26, 2013, which is incorporated herein by reference in its entirety.

BACKGROUND

The embodiments described herein relate generally to a systems and methods for measuring the displacement of a rotating shaft and, more specifically, to systems and methods for measuring axial displacement of a shaft within a gas turbine engine using an eddy current sensor.

Gas turbine engines (e.g., jet engines) include a rotating shaft that has compressor and/or turbine blades mounted thereon and rotating therewith. Power can be extracted from the turbine engine via an output shaft (also referred to as a torque shaft) that is coupled between the turbine stage and a gearbox or other power extraction mechanism. Such rotating shafts are supported within the turbine engine via thrust bearings and/or other mechanisms to limit the axial movement of the shaft during use. Excessive axial movement of the shaft relative to the remainder of the engine (e.g., the housing) is an abnormal movement and can be indicative of engine failure (e.g., shaft breakage). When the shaft of a turbine engine breaks, the turbine portion can move backwards because of the effect of combustion gases. Additionally, the compressor mass is decoupled from the rotating system so the shaft and turbine can rotate significantly more quickly. The excessive axial movement of the turbine and/or compressor when the shaft breaks can be sufficiently fast to cause a catastrophic failure of the turbine. Hence, detection of axial movement of the shaft relative to the remainder of the engine can be used to detect engine failure and to prevent additional damage to the engine by, for example, activating a shut off of the engine. In addition to detecting a catastrophic engine failure, detection of the axial shaft displacement over time can provide valuable insight into the rate of wear of engine components and/or potential design improvements to the same.

Alleviating challenges associated with measuring axial shaft displacement within gas turbine engines while the shaft is rotating is an area of interest. Known approaches for measuring displacement of components are susceptible to a number of limitations associated with their application in a gas turbine engine. For example, known methods of measuring displacement using optical techniques are not well suited in the environment within a gas turbine engine, which can be filled with oil mist (for lubrication). The tight clearances between the components of a gas turbine engine can also inhibit known measurement techniques from being used by limiting the size and/or consistency of the target area for detection.

Accordingly, a need exists for improved detection techniques for the measurement of axial displacement of shafts in a gas turbine engine.

SUMMARY

In some embodiments, an apparatus includes a target member, a sensor and a mounting assembly. The target member is coupled to a shaft disposed within an engine housing that rotates about an axis. The target member includes a target surface that is substantially normal to the axis of rotation of the shaft. The sensor is configured to produce a signal associated with a distance between a sensor tip and the target surface. The mounting assembly is coupled to the sensor and the engine housing, and is configured to adjust the distance between the sensor and the target surface.

BRIEF DESCRIPTION OF THE DRAWINGS

FIG. 5B is a back view of the target member shown in FIG. 5A.

FIG. 5C is a side view of the target member shown in FIG. 5A.

FIG. 5D is a top view of the target member shown in FIG. 5A.

FIG. 7 is a perspective view of a mounting assembly securing a sensor, according to an embodiment.

FIG. 9 is a flow chart illustrating a method for mounting a proximity sensor to measure the axial position of a rotating shaft in a gas turbine engine, according to an embodiment.

DETAILED DESCRIPTION

In some embodiments, an apparatus includes a target member, a sensor and a mounting assembly. The target member is coupled to a shaft disposed within an engine housing that rotates about an axis. The target member includes a target surface that is substantially normal to the axis of rotation of the shaft. The sensor is configured to produce a signal associated with a distance between a sensor tip and the target surface. The mounting assembly is coupled to the sensor and the engine housing, and is configured to adjust the distance between the sensor and the target surface.

In some embodiments, an apparatus includes a target member, a sensor and a mounting assembly. The target member is configured to be coupled to a rotatable shaft that is disposed within an engine housing. The target member includes a target surface and a balance surface. The target surface is substantially normal to an axis of rotation of the shaft, and the balance surface is a tapered surface that is opposite to the target surface. The sensor is configured to produce a signal associated with a distance between a sensor tip and the target surface. The mounting assembly is coupled to the sensor and the engine housing.

In some embodiments, a method includes disposing a target member about a shaft of an engine such that a target surface of the target member is substantially normal to an axis of rotation of the shaft. The shaft of the engine is disposed within an engine housing. The method also includes coupling a sensor to the engine housing, where the sensor can produce a signal associated with a distance between a sensor tip and the target surface. The method further includes adjusting a position of the sensor to change the distance between the sensor and the target surface.

As used in this specification, the singular forms "a," "an" and "the" include plural referents unless the context clearly dictates otherwise. Thus, for example, the term "a sensor" is intended to mean a single sensor or a combination of sensors.

As used herein, the terms "normal," "perpendicular" and "orthogonal" generally describe a relationship between two geometric constructions (e.g., two lines, two planes, a line and a plane, or the like) in which the two geometric constructions intersect at substantially 90°. For example, a line is said to be perpendicular to another line when the lines intersect at an angle substantially equal to 90°. Similarly, when a planar surface (e.g., a two dimensional surface) is said to be orthogonal to another planar surface, the planar surfaces are disposed at substantially 90° as the planar surfaces extend to infinity. Thus, two geometric constructions are considered as "substantially normal" when they are within five degrees of being perpendicular (i.e., within a range of 85 to 95 degrees).

Figure 1:
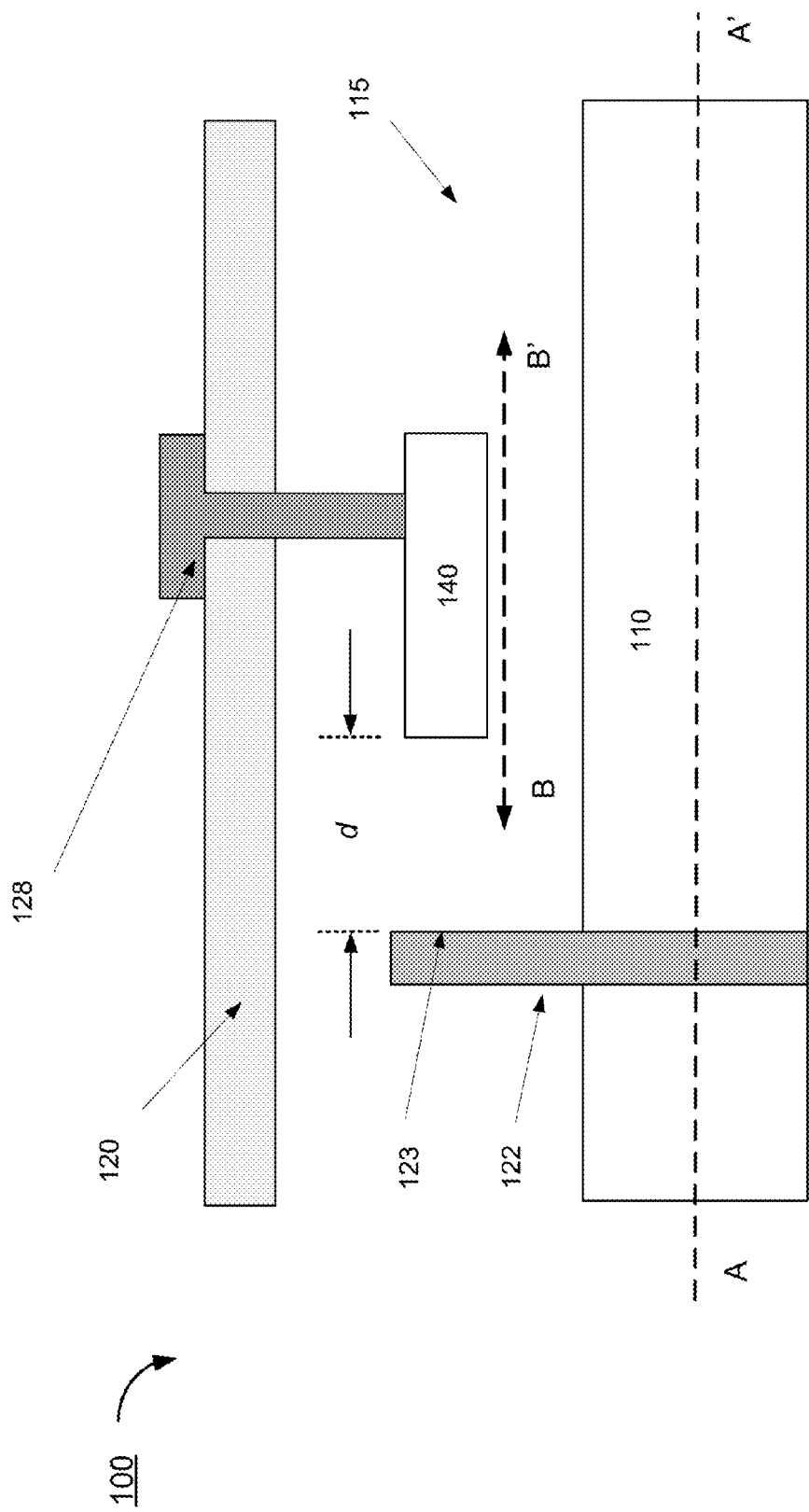
FIG. 1 is a schematic illustration of a system for measuring axial displacement of a rotating shaft, according to an embodiment.

FIG. 1 is a schematic diagram of a system for measuring axial displacement a rotating shaft, according to an embodiment. The system 100 includes a rotating shaft 110 disposed within a housing 120. The housing 120 defines an interior channel or lumen (e.g., the housing channel 115) that can house and/or contain the shaft 110. The rotating shaft 110 can be, for example, a torque shaft located within a gas turbine engine, a steam turbine or any other suitable fluid power machine (not shown). The shaft 110 has a longitudinal axis of rotation (shown as line A-A' in FIG. 1) about which it rotates within the housing 120. During standard operating conditions, the shaft 110 may move axially (i.e., along the axis of rotation) during rotation. Such axial movement (or displacement) may be due to wear of mounting components (e.g., thrust bearings) or the like. The shaft 110 can also move axially during a failure event. The system 100 is configured to detect such axial movement and/or when such movement exceeds a certain threshold.

The system 100 includes a target member 122 that is fixed and/or coupled to the shaft 110. The target member 122 can be made of a conductive material (e.g., steel, a conductive alloy, etc.) and includes a target surface 123 that is substantially normal with respect to the axis of rotation A-A' of the shaft 110. In this manner, the target surface 123 defines a uniform and/or spatially constant surface for detection of axial movement of the shaft 110. In particular, the movement and/or the displacement of the target member 122 that is coupled to the rotating shaft 110 can be used to measure the axial displacement (i.e., linear displacement along the axis A-A') of the shaft 110 using a sensor 140.

The target member 122 can be monolithically constructed with the shaft 110 or can be separately constructed and/or removably coupled to the shaft. In such embodiments where the target member 122 is separately constructed from the shaft 110, the target member 122 can be produced with different shapes and/or sizes to fit a variety of shafts within a pre-determined tolerance. For example, in some embodiments the target member 122 can be constructed to fit about the shaft 110 within a tolerance of 0.001 inches, 0.0005 inches, etc.). Similarly stated, the target member 122 can be coupled to the shaft via a close-tolerance fit to ensure that the runout and/or "wobble" of the target surface 123 is minimized.

The system 100 also includes a sensor 140 that produces a signal associated with the axial displacement and/or spacing of the target member 122 with respect to the sensor 140. Similarly stated, the sensor is configured to produce a signal associated with the distance d between the target surface 123 and a tip of the sensor 140, as shown in FIG. 1. The sensor 140 can be any suitable sensor for detecting the distance d of the rotating target surface 123. The sensor 140 can be, for example, a capacitive displacement sensor, an optical sensor, an eddy-current proximity sensor, a magnetic displacement sensor, a pneumatic proximity sensor, and/or the like. The sensor 140 can be adjustably coupled to the housing 120 with a mounting assembly 128.

The mounting assembly 128 can be used to adjust the distance d between the sensor 140 and the target surface 123. Hence, the mounting assembly 128 can be used to determine and/or set the sensor 140 within an optimal range of the target surface 123 such that the sensor 140 can sense axial displacements of the target surface 123 with maximum sensitivity. For example, in some embodiments the proximity sensor 140 can have an effective range for operation (e.g., a range within which the signal is linear with the distance d), and thus the sensor 140 placement within the housing channel 115 can be adjusted to fall within the desired range. For example, in some embodiments, the sensor 140 can have a suitable range of the distance d between about 0.020 inches and about 0.150 inches. The mounting assembly 128 can include, for example, mounting brackets, set screws, receptacles for fasteners (e.g., threaded screws, etc.) and can be used to slide the sensor 140 in a direction substantially parallel to the axis of rotation of the shaft (e.g., along line BB' in FIG. 1) to facilitate adjustment. Moreover, in some embodiments, the adjustment assembly 128 can be configured to adjust the distance d over a first range (e.g., a coarse range setting) and a second range (e.g., a fine range setting). Such adjustment also allows for calibration of the system 100, as described herein.

Figure 2:
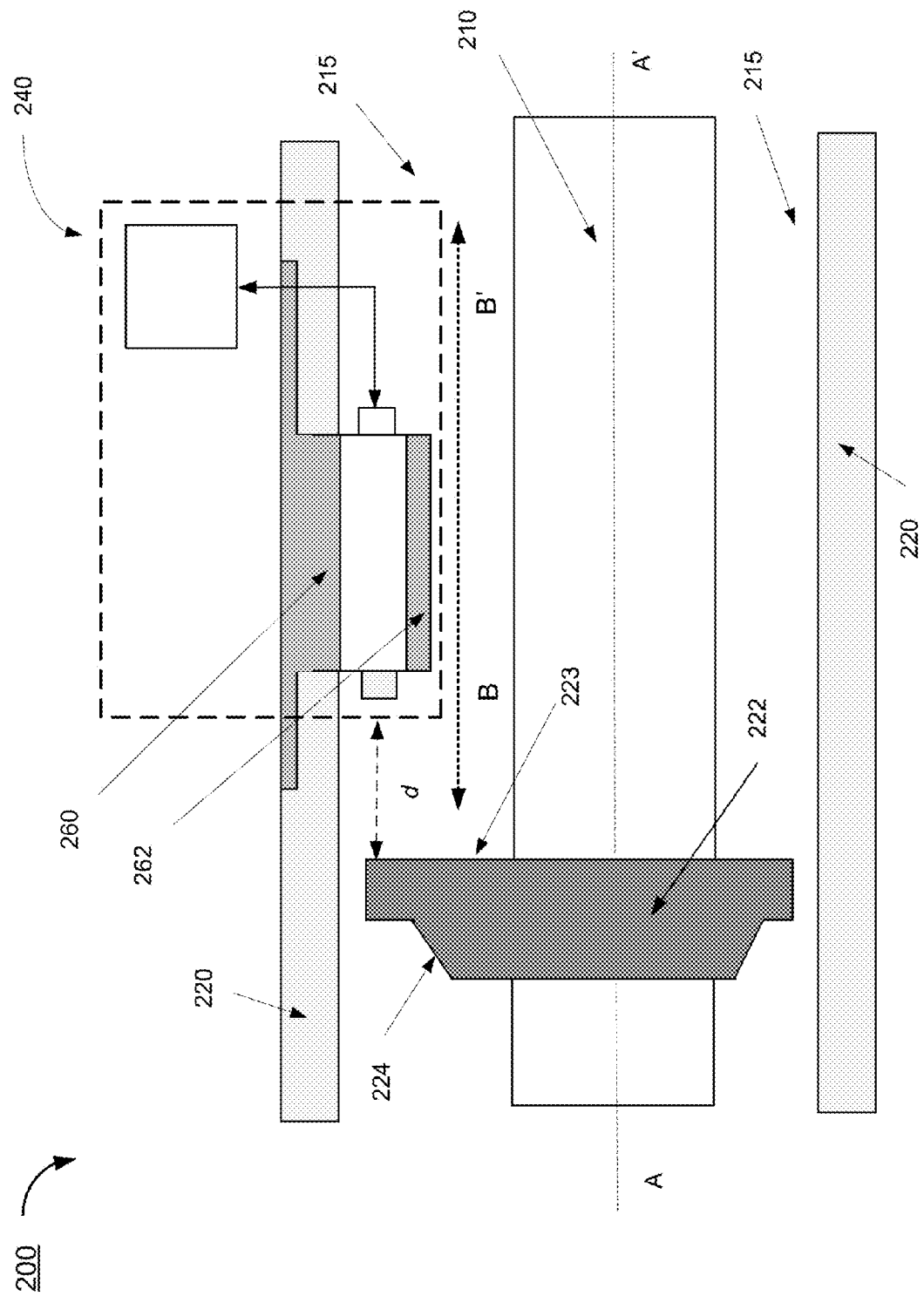
FIG. 2 is a cross-sectional view of a system to measure the axial displacement of a rotating shaft in a gas turbine using an eddy current proximity sensor, according to an embodiment.

FIG. 2 is a cross-sectional view of a system to measure the axial displacement of a rotating shaft in a gas turbine engine using an eddy current proximity sensor, according to an embodiment. The gas turbine engine (not shown) includes a rotating shaft 210 which can be, for example, a torque shaft located within the housing or casing 220. The engine housing 220 defines an interior channel or lumen (e.g., the housing channel 215) that can house the rotating shaft 210. The shaft 210 has a longitudinal axis of rotation (seen as line A-A' in FIG. 2) about which it rotates within the housing 220. During standard operating conditions, the shaft 210 may move axially (i.e., along the axis of rotation) during rotation. Such axial movement (or displacement) may be due to wear of mounting components (e.g., thrust bearings), thermal expansion or the like. The shaft 210 can also move axially during a failure event. The system 200 is configured to detect such axial movement and/or when such movement exceeds a certain threshold.

The system 200 includes a target member 222 that is coupled to the shaft 210. The target member 222 can be constructed of a conductive material (e.g., steel, ferric alloys, etc.) and includes a target surface 223 and a balance surface 224. The target surface 223 is a substantially flat surface and/or is substantially normal with respect to the axis of rotation A-A'. The target surface 223 acts as a target (or reference surface) for a proximity sensor 240 to measure the axial displacement of the shaft 210 during rotation. Because the target member 222 is affixed to the shaft 210, any movement of the shaft (both rotationally and translationally along the axis A-A') can be detected via the target member 222 and/or the target surface 223. In this manner, the movement of the target member 222 can be used to indirectly measure the axial displacement of the shaft 210 using the sensor 240.

The target member 222 can affixed to the shaft 210 by any suitable mechanism. For example, the target member 222 can be a separate piece mounted to the shaft 210 or can be an integral portion of the shaft 210. In some instances, the target member 222 may have a clamshell design that produces an interference fit on the shaft 210 when closed about the shaft. In this manner, the target member 222 can be affixed to any existing shaft 210 without modification to the shaft 210. In other instances, the target member 222 can include a first portion and a second portion, and the target member 222 can be moved between a first configuration (e.g., an expanded configuration) and a second configuration (e.g., a collapsed configuration) to fixedly couple the target member 222 to the shaft 210. In such instances, the second portion of the target member 222 is spaced apart from the first portion when the target member 222 is in the first (e.g., expanded) configuration. The second portion of the target member 222 is in contact with the first portion of the target member 222 when the target member 222 is in the second (e.g., collapsed) configuration.

In yet other instances, the target member 222 can be only a single portion that is couple to the shaft 210. In such instances, the target member 222 can be fitted onto the shaft 210 by, for example, sliding the target member 222 onto the surface of the shaft 210 (e.g., after heating and expanding the target member 222) followed by cooling and attachment of the target member 222 on the surface of the shaft 210, and/or the like. Regardless of the specific configuration, the target member 222 can be configured such that the attachment of the target member 222 to the shaft 210 is within controlled tolerances (e.g., 0.001 inches, 0.0005 inches, etc.) to prevent and/or reduce the occurrence of discontinuities and/or disjointed regions either on the target member 222 or between the target member 222 and the shaft 210. Such discontinuities and/or disjointed regions can typically lead to alternating current (AC) noise in the output signal of the sensor 240 that can, in some instances, require the use of complex signal processing algorithms to reduce and/or eliminate such noise from the electrical output of the sensor 240.

The balance surface 224 of the target member 222 is on the opposite side of the substantially planar target surface 223, and is configured for balancing the target member 222 on the shaft 210. In particular, the balance surface 224 can be tapered and can have a portion of its initial mass removed to properly balance the target member 222 on the shaft 210. The portion of mass removed can be progressively increased to accurately balance the target member 222 on the shaft 210 to meet pre-determined tolerance levels. In other instances, the balance surface 224 can also have additional mass added thereto to properly balance the target member 222 on the shaft 210 to meet pre-determined tolerance levels. The mass added to or removed from to the balance surface 224 can be progressively incremented by any suitable mechanism, such as via machining, decoupling or coupling via an adhesive or the like, to accurately balance the target member 222 on the shaft 210.

As shown in FIG. 2, in some instances the balance surface 224 can be tapered to minimize the likelihood of rubbing or interference with the housing 220.

The sensor 240 can be, for example, an eddy-current proximity sensor that can facilitate sensing of the axial position of the shaft 210 with respect to the engine housing 220. The sensor 240 can produce an electric signal (e.g., a voltage, a current, etc.) corresponding to the distance d between the sensor 240 and the target surface 223. The strength or magnitude of the electrical signal produced by the sensor 240 is a function of the distance d between the target member 222 and the sensor 240. As discussed herein, it is important that the distance between the target member 222 and the sensor 240 be within an effective operational range of the sensor 240, thus the sensor 240 and the mounting assembly are collectively configured to adjust the nominal distance d.

Figure 4:
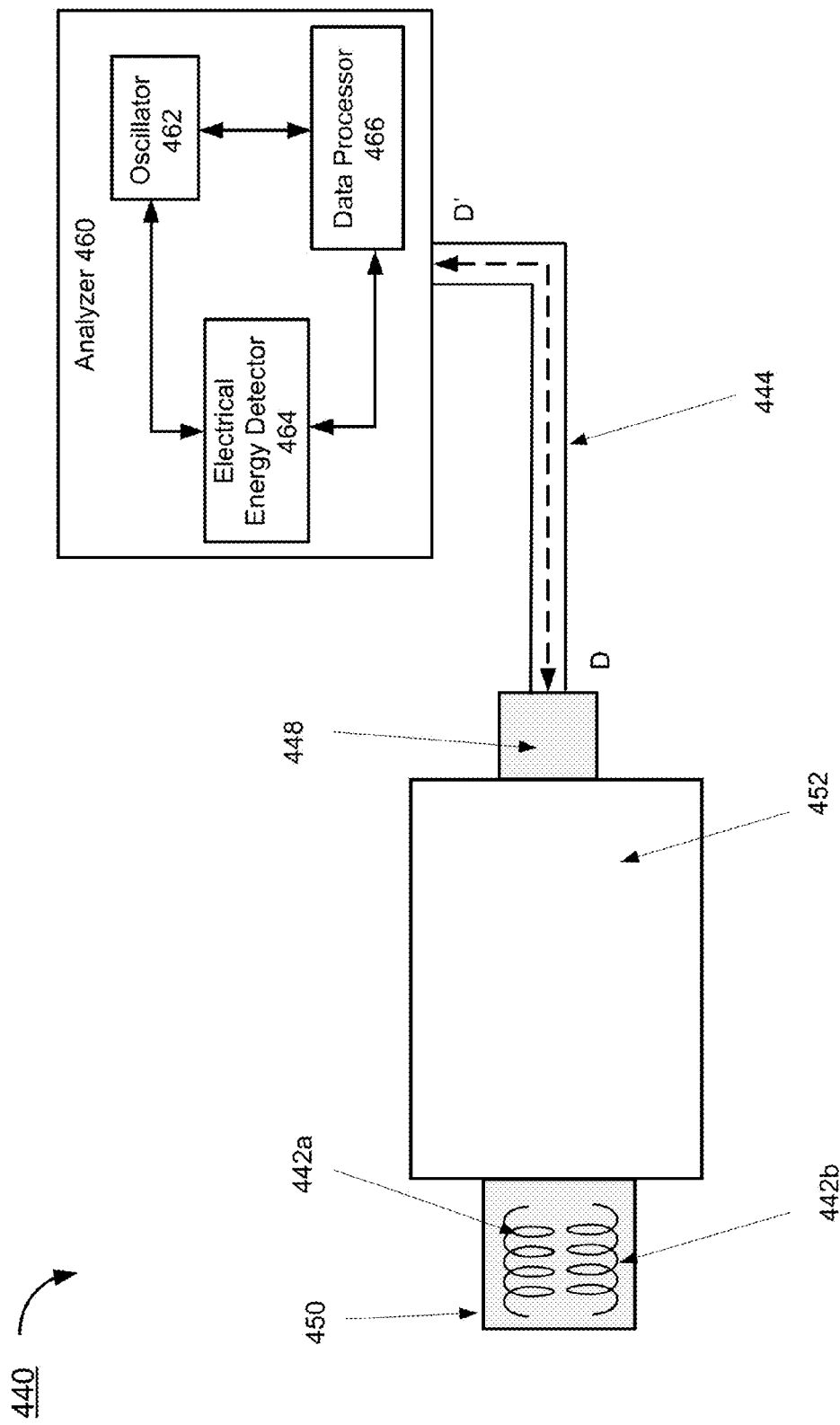
FIG. 4 is a schematic illustration of an eddy-current proximity sensor for measuring the axial displacement of a rotating shaft, according to an embodiment.

The sensor 240 can include a sensing coil(s), or an inductive probe that can be supplied with an alternating current signal or radio frequency signal from an oscillator within an analyzer (not shown in FIG. 2, but described in greater detail in relation to FIG. 4). Hence, the sensor 240 can create an alternating current in the sensing coil in the tip of the sensor (not shown in FIG. 2 and described below in greater detail in relation to FIG. 4). Such alternating currents can create alternating magnetic field which can induce (e.g., small) currents in the target member 222, whereby such induced currents are called eddy currents. The eddy currents can create an opposing magnetic field in the vicinity of the target member 222 that can resist the field being generated by the sensor 240. The interaction of the magnetic fields is dependent on the distance between the sensor 240 and the target member 222 as shown in FIG. 2 (see "d" in FIG. 2). As the distance between the sensor 240 and the target member 222 changes, the sensor 240 can sense the change in the interaction of the magnetic fields and produce a voltage output which is proportional to the change in distance between the sensor 240 and the target member 222.

In some configurations, for redundancy, the system 200 can include multiple sensors in varying circumferential positions about the shaft. For example, in some configurations, the system 200 can include a first sensor 240 and a second sensor disposed circumferentially opposite the first sensor, with both sensors adjustably coupled to the engine housing 220. In such configurations, the first sensor 240 produces a first signal associated with the distance d between the target surface 223 and the first sensor 240, and the second sensor 240 produces a second signal associated with the distance d between the target surface 223 and the second sensor 240.

The sensor 240 can be adjustably coupled to the engine housing 220 with a mounting assembly 261. In this manner, the tip of the sensor 240 can be positioned within the desired operational range. The adjustability also allows the system 200 to be calibrated (i.e., to develop a curve of signal vs. known distance) such that in use, the change in the distance d can be accurately determined. As shown in FIG. 2, the mounting assembly 261 includes a first adjustment portion 260 and a second adjustment portion 262. The first adjustment portion 260 of the mounting assembly can adjust the distance between the sensor 240 from the target surface 223 over a first range (e.g., a coarse range adjustment), and the second adjustment portion 262 of the mounting assembly can adjust the distance the sensor 240 from the target surface 223 over a second range (e.g., a fine range adjustment). The first adjustment portion 260 is adjustably coupled to the engine housing 220, and defines a channel within which the sensor 240 is slidably coupled.

Figure 3:
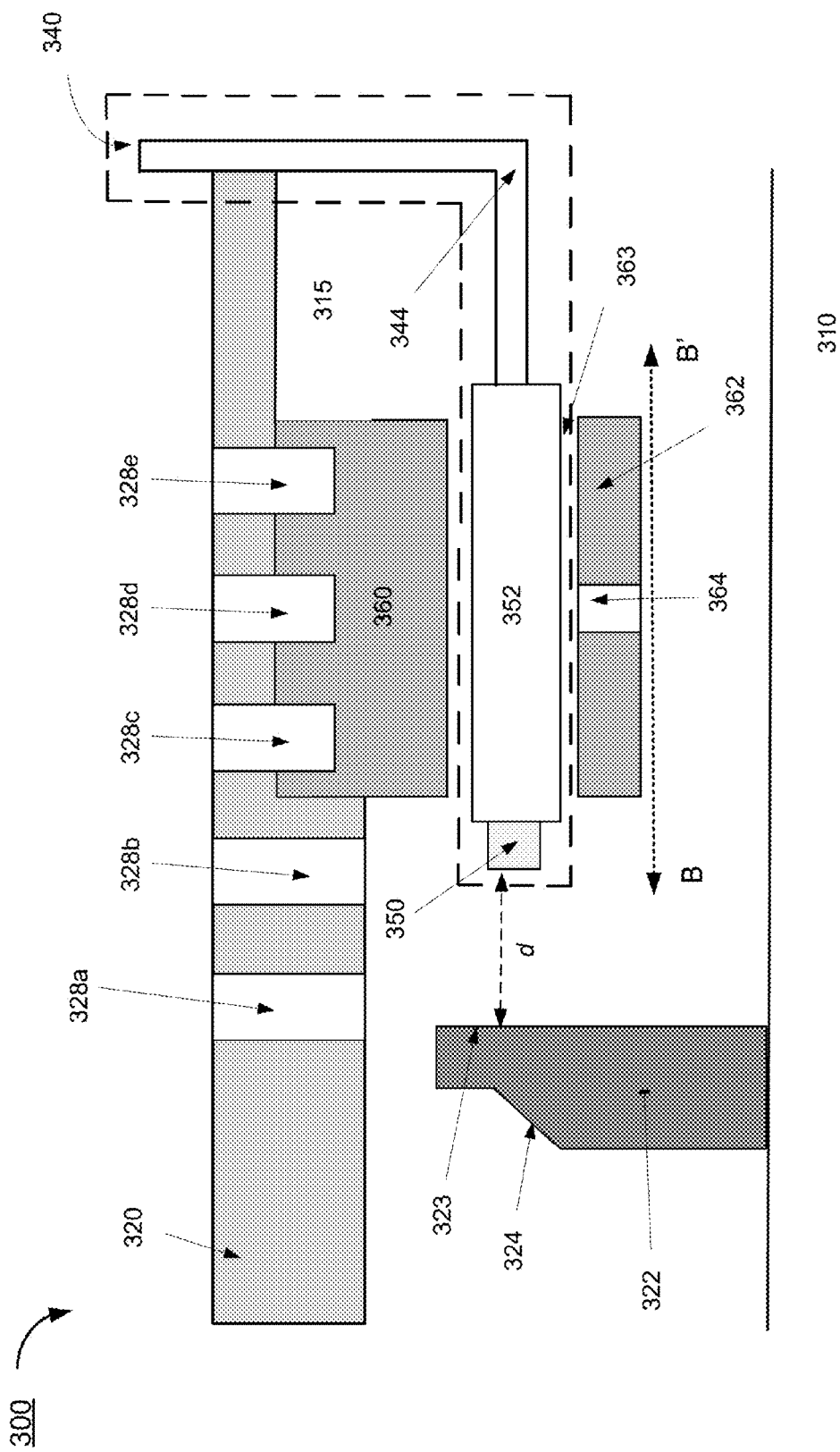
FIG. 3 is a cross-sectional view showing a system for adjustably coupling a sensor to a housing of a gas turbine engine using a mounting assembly, according to an embodiment.

The mounting assembly 261 can employ any suitable mechanisms to facilitate the fine and coarse adjustments. For example, FIG. 3 is a cross-sectional view showing a mounting assembly 361 for adjustably coupling an eddy current sensor to an engine housing of a gas turbine engine, according to an embodiment. To ensure that the target surface 323 is within the operational range of the sensor 340 and/or to calibrate the system, the axial position of the sensor 340 (e.g., related to the axial movement along the line B-B' in FIG. 3) can be adjusted via the mounting assembly 361, which can allow for both gross and fine adjustments in the position of the sensor 340. The mounting assembly 361 that affixes the sensor 340 to the engine housing 320 includes two portions, namely a first adjustment portion 360 and a second adjustment portion 362. The first adjustment portion 360 of the mounting assembly is coupled to an engine housing 320 that defines a set of mounting openings 328a-328b, (e.g., slots, grooves, threading, etc.). As described herein, the engine housing (or casing) 320 also defines a housing channel 315 within which the shaft 310 and the moving sensor 340 are disposed. Additionally, the housing channel 315 also provides a channel for coupling the electrical wiring 344 to the sensor body 352 and, for example, a power source and/or an analyzer (not shown in FIG. 3 but discussed in detail in relation to FIG. 4).

As shown in FIG. 3, the first adjustment portion 360 can be bolted to the stationary engine housing 320 via the set of openings 328a-328e. In some configurations, one or more of the set of openings 328a-328e can also act as an access port to thread the electrical wiring 344 of the sensor 340, thus avoiding the necessity to modify existing hardware associated with the shaft 310 and/or the engine housing 320. In some configurations, the first adjustment portion 360 may also have alignment markings to properly align the sensor 340 to the target surface 323. In some configurations, the first adjustment portion 360 can also be provided with an array of bolt holes for affixing the first adjustment portion 360 to the housing 320. In this manner, the first adjustment portion 360 can be used to adjust the distance of the sensor 340 from the target surface 323 over a first pre-determined range (e.g., a larger coarse range). Because the first adjustment portion 360 is coupled via any of the set of openings 328a-328e, the axial location of the second adjustment portion 362, and thus the sensor 340, can be grossly adjusted.

The mounting assembly 361 also includes a second adjustment portion 362 that defines a mounting channel 363 that can accept the sensor body 352 and that allows the sensor body 352 to freely translate along the axis of rotation (i.e., along the line BB' shown in FIG. 3). The second adjustment portion 362 includes a bolt opening 364 that can be used to house, for example, a set screw (not shown). Such set screw can be used to adjust the position of the sensor 340 from the target surface 323 (as the sensor housing 352 is free to slide within the mounting channel 363) over a second pre-determined range (e.g., a smaller, fine range), where the first pre-determined range is greater than the second pre-determined range. Additionally, such set screw can also be used to lock the sensor housing 352 in an appropriate axial position that can allow for optimal functioning of the sensor 340.

The sensor 340 shown in FIG. 3 can be an eddy current sensor and is described in greater detail here in relation to FIG. 4. The sensor 340 includes a sensor tip 350, a sensor body (or housing) 352, and sensor electrical wiring 344. The sensor tip 350 can be constructed from a dielectric material (e.g., a plastic) and can house the sensing coils of the eddy current sensor 340. The sensor housing 352 can house the different electrical and support components of the sensor 340 and can also act as a protective cover for the different components of the sensor 340. The sensor electrical wiring 344 can send a set of signal(s) to and/or from the analyzer (not shown in FIG. 3 and described in greater detail in relation to FIG. 4) to and/or from the sensor tip 350 that can generate and/or define the AC current at the sensing coils on the sensor tip 350. The sensor electrical wiring 344 can also receive and/or send the output voltage created by the interaction of the different magnetic fields created during the operation of the sensor 340 to the analyzer (not shown in FIG. 3 and described in greater detail in relation to FIG. 4).

FIG. 4 is a schematic illustration of an eddy-current proximity sensor for measuring the axial displacement of a shaft in a gas engine turbine, according to an embodiment. The sensor 440 includes a sensor tip 450, a sensor housing 452, an electrical connector 448, electrical wiring 444, and an analyzer 460. The sensor tip 450 can be constructed of a dielectric material (e.g., plastic, mica, glass, oxides of various metals, etc.) and can house the sensing coils 442a-442b of the eddy current sensor 440. The sensing coils 442a-442b are constructed from a conductive metal such as, for example, steel, aluminum, brass, copper, and/or the like. The sensing coils 442a-442b are supplied with an alternating current (AC) signal or radio frequency signal from an oscillator 462 within the analyzer 460. The sensing coils 442a-442b produce an alternating magnetic field within the immediate vicinity as a result of the AC signals fed from the analyzer 460. Such alternating magnetic field induces small currents in the conductive target surface (e.g., target surface 323 in FIG. 3) that are known as eddy currents. The eddy currents induced in the target surface create an opposing magnetic field in the vicinity of the target surface that can oppose the alternating magnetic fields created by the sensing coils 442a-442b. The interaction of the magnetic fields created by the sensing coils 442a-442b with the opposing magnetic fields created by the eddy currents in the target surface can be detected by the sensing coils 442a-442b, and produces an electrical output (e.g., an output voltage, an output current, etc.) that is dependent on the distance between the sensor tip 450 and the target surface.

The sensor housing 452 can be a metallic or a non-metallic housing that can store the different electrical and support components of the sensor 440. The sensor housing 452 is coupled to an electrical connector 448 that can connect via the sensor wiring 444, the sensor housing 452 to the analyzer 460. The sensor wiring 444 can be any kind of electrical wiring such as, for example, coaxial copper wires, aluminum wires, NM-B electrical wires (insulated conductors enclosed within an overall nonmetallic jacket), NMC electrical wires (insulated conductors enclosed within an overall, corrosion resistant, nonmetallic jacket), and/or the like. The sensor wiring 444 can conduct electrical signals from the analyzer 460 to the sensor housing 452 and/or the sensor tip 450, and electrical signals from the sensor housing 452 and/or the sensor tip 450 to the analyzer 460. Hence, the sensor wires 444 conducts electrical signals in a bi-directional fashion as shown by the path DD' in FIG. 4.

The analyzer 460 can be a hardware module and/or a software module (stored in a memory chip and/or executed in the processor) located within an electrical computing device. The analyzer 460 is electrically or electromagnetically coupled to the sensor housing 452 as shown in FIG. 4. The analyzer 460 includes an oscillator 462 for generating an alternating current signal (or a radio frequency signal), an electrical energy detector 464 for detecting the change in the electromagnetic fields or the induced eddy current fields in the vicinity of the sensor tip 450 by the output signal by the sensor tip 450, and a data processor 466 for correlating the changes in the induced eddy current fields to a change in an axial position of the target surface (e.g., target surface 323 in FIG. 3) with respect to the sensor tip 450. The oscillator 462 can generate one or more signals within a pre-defined spectral range (e.g., 10 Hz to 10 kHz) to energize or activate the sensor 440 and to cause the radiation of an eddy current induced magnetic field (electromagnetic radiation) from the target surface.

In some configurations, the electrical energy detector 464 can be a voltage meter or a voltage measuring device that is operably coupled to the sensing coils 442a-442b in the sensor tip 450. In such configurations, the electrical energy detector 464 will be coupled in parallel to the sensing coils 442a-442b to measure the output voltage generated by the sensing coils 442a-442b. In other configurations, the electrical energy detector 464 can be a current meter or a current measuring device that is operably coupled to the sensing coils 442a-442b in the sensor tip 450. In such configurations, the electrical energy detector 464 will be coupled in series to the sensing coils 442a-442b to measure the output current generated by the sensing coils 442a-442b. In some instances, the electrical energy detector 464 can be coupled to an analog-to-digital converter if the sensing coils 442a-442b generates an analog output signal.

The data processor 466 determines the axial or longitudinal position of the rotating shaft (e.g., shaft 210 in FIG. 2) with respect to engine housing (e.g., engine housing 200 in FIG. 2) at a substantially periodic time interval based on the eddy current induced electromagnetic fields generated at the target surface (e.g., target surface 223 in FIG. 2) that is detected by the electrical energy detector 464. The data processor 466 can convert the signals received to a distance d based on a calibration curve produced when the sensor 440 is coupled to the housing relative to the target surface.

The sensor 440 senses an eddy current or an electromagnetic field induced by the eddy current in the target surface to detect the axial position of the rotating shaft within a housing at a particular time. For example, the sensor 440 senses a first eddy current or a first electromagnetic field when the rotating shaft has a first axial position with respect to the stationary sensor tip 450; and the sensor 440 senses a second eddy current or a second electromagnetic field when rotating shaft has a second axial position with respect to the stationary sensor tip 450. The change in eddy current (or electromagnetic field induced by the eddy current) between the first eddy current and the second eddy current indicates the movement or change in axial position of the shaft. The electrical energy detector 464 measures the change in the eddy current or electromagnetic field associated with the axial displacement of the shaft by monitoring the current and/or voltage induced in the sensor 440. In some instances, the data processor 466 can store a calibration reference table or database of axial positions of the shaft as a function of the measured output voltage and/or current values. In such instances, the sensed voltage or current value is compared to the reference current value to determine the axial position of the shaft.

Figure 5A:
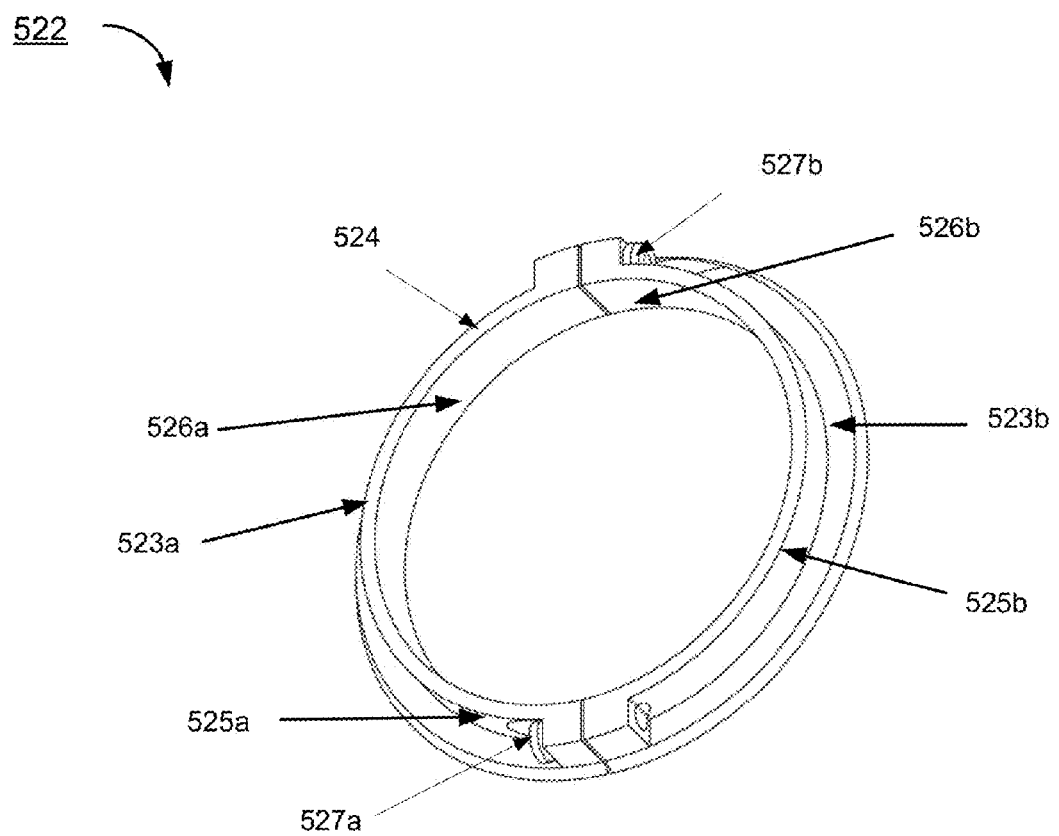
FIG. 5A is a perspective view of a target member in a collapsed (or assembled) configuration, according to an embodiment.

FIG. 5A is a perspective view of a target member 522, according to an embodiment. The target member 522 can be removably coupled to a shaft, and is movable between a collapsed (or coupled configuration) and an expanded (or removed) configuration. Shown here in the collapsed configuration, the target member 522 includes a portion 523a and a second portion 523b attached to each other via the connectors 527a and 527b. It is important to note that the internal surfaces 526a and 526b of the first portion 523a and the second portion 523b of the target member have a surface roughness and/or finish to produce a very close-tolerance fit to the shaft (see e.g., FIGS. 6A and 6B) to which the target member is coupled. Similarly stated, the internal surfaces 526a and 526b are tightly controlled during the manufacturing process (e.g., within 0.001 inches tolerance between the shaft outer diameter, 0.0005 inch tolerance between the shaft outer diameter, or even less) to properly fit of the target member 522 onto the shaft. The high tolerance levels of the target member 522 can substantially reduce surface imperfections and/or disjointed regions (e.g., of the target surface 523 that can lead to increased noise levels (e.g., AC noise) in the output signals recorded by the eddy current sensor.

FIG. 5B is a back view of the target member 522 shown in FIG. 5A, showing the balance surface 524. The target member 522 is shown in the collapsed configuration whereby the first portion 523a and the second portion 523b of the target member 522 are attached to each other via the connectors 527a and 527b. Note that the target surface is not shown in FIG. 5B and lies on the opposite end of the balance surface 524. The balance surface 524 is configured for balancing the target member 522 on the shaft. In particular, the balance surface 524 is tapered and can have a portion of its initial mass removed and/or additional mass added thereto properly balance the target member 522, as described herein.

FIG. 5C is a side view of target member 522 shown in FIG. 5A. The target member 522 can either be in an expanded configuration where the two portions of the target member 523a and 523b are spaced apart (i.e., to allow installation and/or coupling to the shaft) or the target member 522 can be in a collapsed configuration where the two portions of the target member 523a and 523b are attached to each other via the connectors 527a and 527b. Note that the target surface 523 is shown in on the left hand edge in FIG. 5C.

FIG. 5D is a top view of the target member 522 shown in FIG. 5A. The target member 522 is shown in the collapsed configuration whereby the first portion 523a and the second portion 523b of the target member are attached to each other via the connectors 527a (shown in FIG. 5D) and 527b (not shown in FIG. 5D). FIG. 5D also shows both the target surface 523 and the balance surface 524 of the target member. As described herein, the target member 522 can be removably coupled to a shaft such that the target surface 523 is substantially normal to an axis of rotation of the shaft.

Figure 6A:
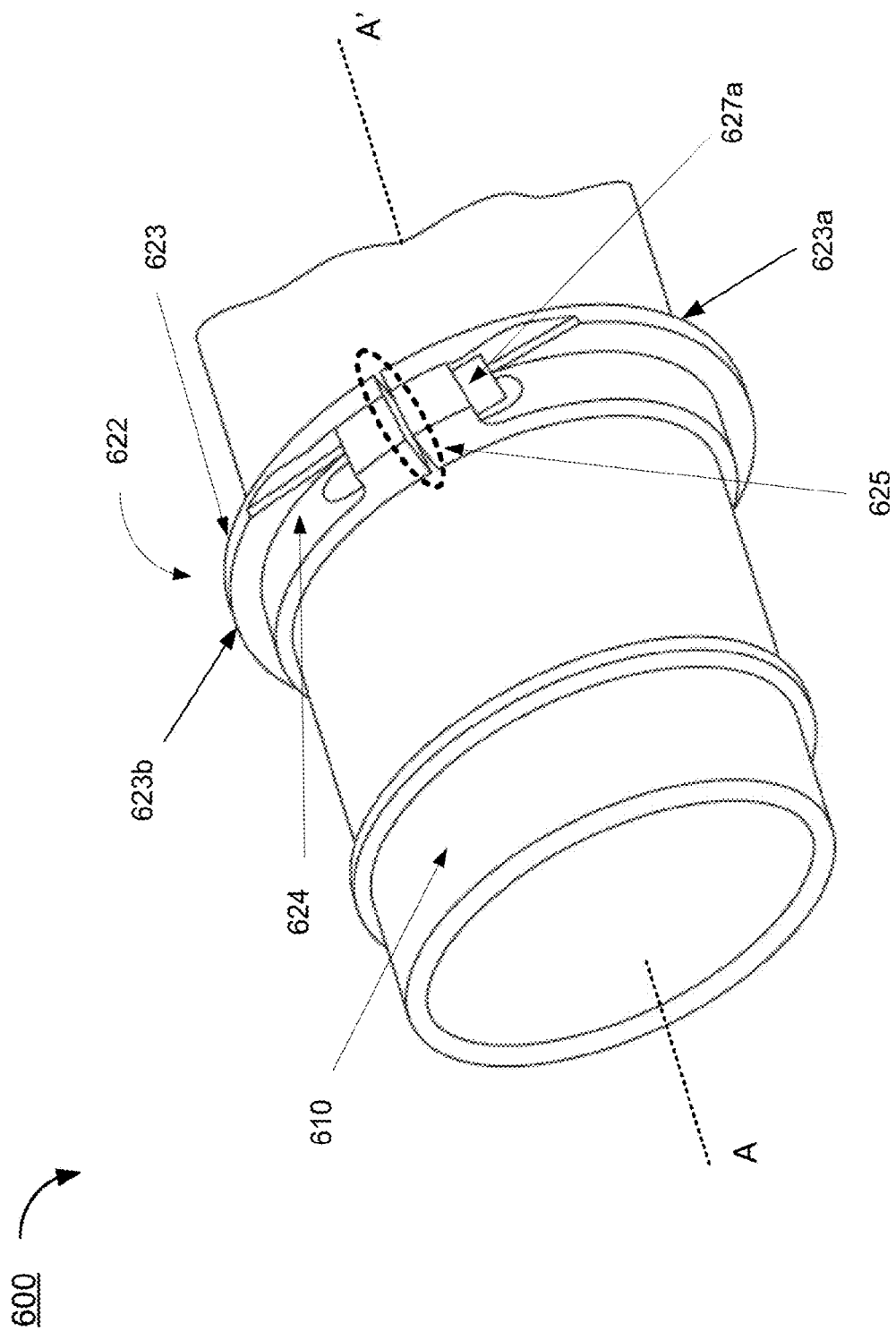
FIGS. 6A and 6B are perspective views of the target member shown in FIG. 5A attached to a shaft.

FIG. 6A is a perspective view of a target member attached to a shaft, according to an embodiment. The embodiment 600 shows a shaft 610 and a target member 622 coupled to the shaft 610 from a back view, where the back view is defined as looking towards the target member 622 from the side of the balance surface 624. The embodiment 600 shows the shaft 610 that can rotate about its axis of rotation along the line A-A' and the target member 622 in the collapsed configuration where a first portion 623a and a second portion 623b of the target member 622 are attached to each other via one or more connectors 627a (shown in FIG. 6A). The target member 622 can be similar to the target member 522 or any other target members shown and described herein, and is therefore not described in great detail. FIG. 6A shows a discontinuity 625 (or a gap) formed at the location of attachment of the two portions of the target member 623*a* and 623*b*. Such discontinuities (or defects) can lead to increased noise levels (e.g., AC noise) in the output signals recorded by the eddy current sensor. For example, during shaft rotation, the discontinuity will periodically align with the tip of a sensor (not shown), thus potentially inducing noise in the signal. Such noise levels from the sensor output can, in some instances, be corrected, filtered and/or accounted for by signal processing algorithms according to an embodiment.

Figure 6B:
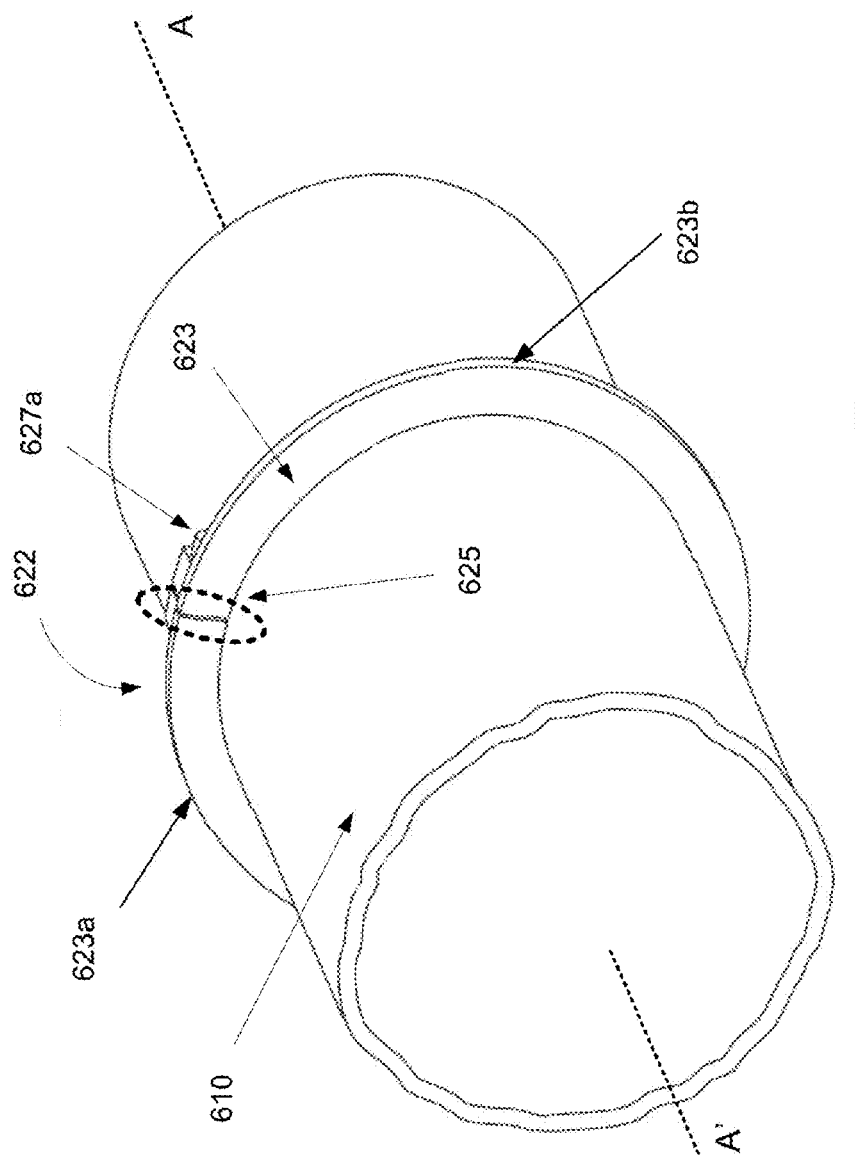

FIG. 6B is a front perspective view of the target member 622 attached to the shaft 610. FIG. 6B shows a shaft 610 and target member 622 coupled to the shaft 610 from a front view (i.e., looking towards the target member 622 from the side of the target surface 623). As described above, the shaft 610 can rotate about its axis of rotation along the line A-A' and the target member 622 is shown in the collapsed configuration where the two portions of the target member 623*a* and 623*b* are attached to each other via connectors. FIG. 6B also shows the discontinuity 625 (or a gap) present along the target surface 623 that is formed at the location of attachment of the two portions of the target member 623*a* and 623*b*.

FIG. 7 is a perspective view of a mounting assembly 728 for securing a proximity sensor 740 within an engine housing of a gas turbine engine, according to an embodiment. The mounting assembly 728 adjustably mounts the sensor 740 to the engine housing 720 via a set of openings 728*a*-728*j*, (e.g., slots, grooves, threading, etc.) to which the sensor housing 752 and sensor wiring 744 can mount. The engine housing 720 also defines a housing channel 715 that houses the different parts of the sensor 740 and provides an opening for coupling the sensor wiring 744 to the sensor housing 752.

Figure 8:
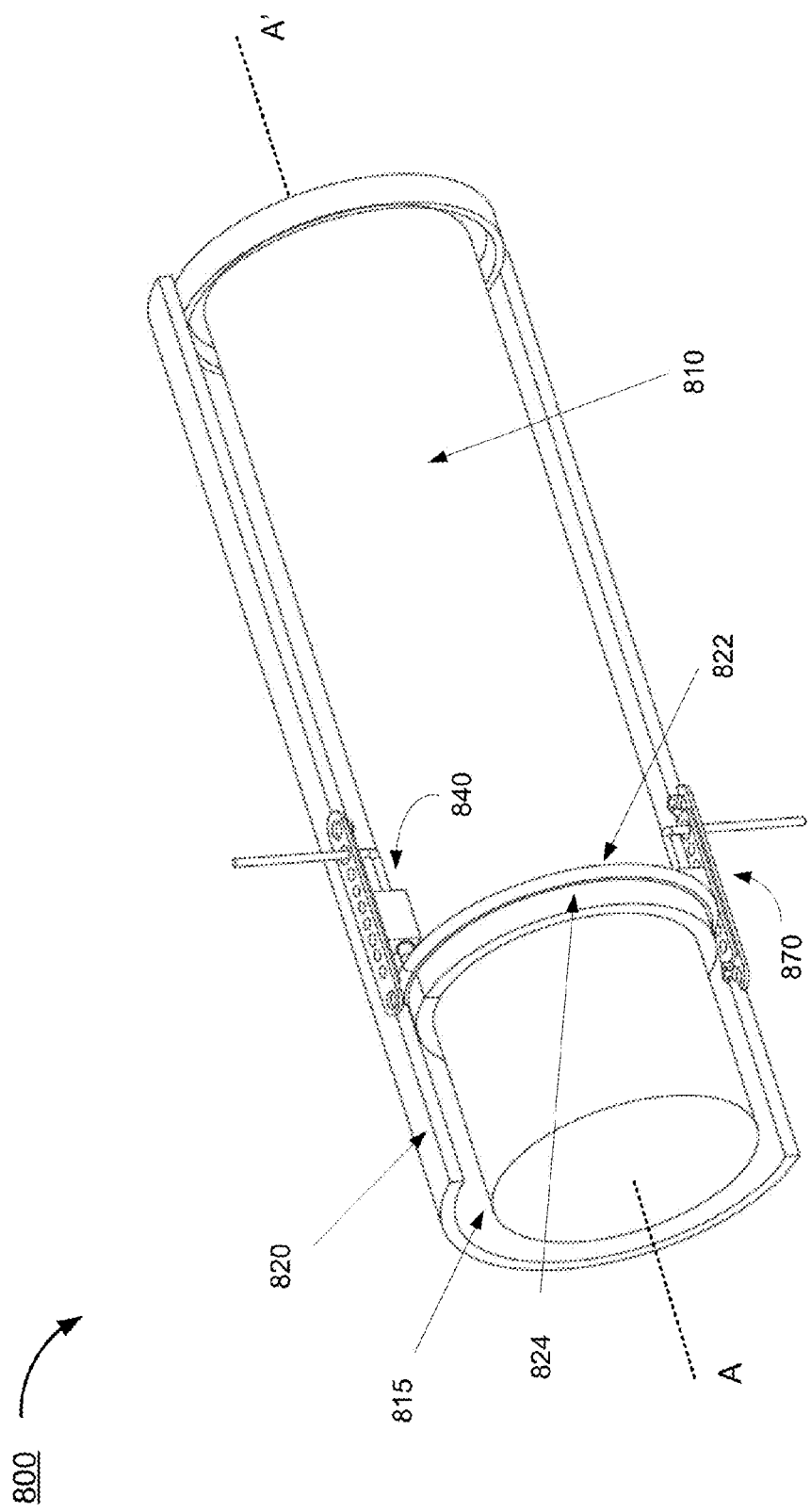
FIG. 8 is a perspective view of a system for measuring axial shaft displacement in a gas turbine engine, according to an embodiment.

FIG. 8 is a perspective view of a set of proximity sensors for measuring axial shaft displacement in a gas turbine engine, according to an embodiment. The embodiment 800 includes a rotating shaft 810, which is housed within an engine housing 820 of a gas turbine engine. The engine housing 820 defines a housing channel 815 within which the rotating shaft 810 and the proximity sensors 840 and 870 are disposed. The shaft 810 has a longitudinal axis of rotation (as shown by the line A-A').

The system 800 includes a target member 822 that is fixed to the shaft 810. The target member 822 is similar to any of the target members described herein, and includes a target surface (not shown in FIG. 8) that is a substantially flat surface and acts as a target for the proximity sensors 840 and 870 to measure the axial displacement of the shaft 810 during rotation. The movement of the target member 822 relative to the housing can be used to indirectly measure the axial displacement of the shaft 810 using the sensors 840 and 870. The target member 822 also includes a balance surface 824 on the opposite side of the substantially planar target surface for balancing the target member 822 on the shaft 810. The target member 822 is shown in FIG. 8 in the collapsed state with the two portions of the target member attached to each other to securely fasten the target member 822 to the shaft 810. The proximity sensor 840 is a first sensor and generates a first signal that is representative of the displacement of the target member 822 with respect to the first sensor 840. The proximity sensor 870 is a second sensor that is disposed circumferentially opposite the first sensor 840 and generates a second signal that is representative of the displacement of the target member 822 with respect to the second sensor 870. The first signal and second signal can be analyzed (e.g., averaged) to determine the axial position of the target member 822 or the shaft 810 at any given time.

FIG. 9 is a flow chart illustrating a method for using a proximity sensor to measure the axial position of a rotating shaft in a gas turbine engine, according to an embodiment. The method 900 includes disposing a target member about a shaft of an engine such that the target surface of the target member is substantially normal to an axis of rotation of the shaft, at 902. As described above, the shaft has a longitudinal axis of rotation and can translate back and forth along the axis of rotation during rotation, either due to routine wear, change in thermal conditions and/or as a precursor to a catastrophic failure. As described above, the target member can be made of a conductive material (e.g., steel) and can include a target surface that is a substantially flat surface and is substantially normal with respect to the axis of rotation of the shaft. In this manner, the target surface can be used to indicate when such axial displacement occurs or exceeds a predetermined threshold.

At 904, a sensor is coupled to an engine housing, where the sensor produces a signal associated with a distance between the sensor tip and the target surface. As described above, the sensor can be, for example, an eddy current based proximity sensor that senses an eddy current or an electromagnetic field induced by the eddy current in the target surface to detect the axial position of the rotating shaft within a stationary engine housing at a particular time. For example, as described above, the sensor can sense a first eddy current or first electromagnetic field when the rotating shaft has a first axial position with respect to the sensor tip; and the sensor can sense a second eddy current or second electromagnetic field when the rotating shaft has a second axial position with respect to the sensor tip. As described above, the change in eddy current (or electromagnetic field induced by the eddy current) between the first eddy current and the second eddy current indicates the movement or change in axial position of the shaft in a given time period.

At 906, the position of the sensor is adjusted to change the distance between the sensor tip and the target surface to maximize the sensitivity of the sensor. As described above, eddy current sensors have an effective operational range. Hence, to ensure that the target surface is within the operational range of the sensor, the axial position of the sensor can be tuned via the appropriate design of the different components of a mounting assembly that can allow for both gross and fine adjustments in the position of the sensor with respect to the target surface.

In some embodiments, a method includes calibrating a system for measurement of axial displacement. In such methods, the sensor (any of the sensors described herein) can be incrementally moved relative to the housing using any of the mounting assemblies described herein. By using "feeler gauges" or other techniques, the known distance can be correlated to an electronic signal produced by the sensor.

In some embodiments, a method includes calibrating a system to account for changes caused by thermal growth. For example, in some embodiments, any of the systems described herein can include a thermocouple and thus can measure the temperature of the shaft, sensor and/or target surface. In such embodiments, the temperature can be used to adjust the calibration curve to account for "in-use" changes due to changes in temperature.

In some embodiments, a method includes filtering noise produced by a discontinuity in a target surface of a target member. Such methods can include anticipating the noise based on a speed and or noise signature associated with the discontinuity. For example, because the discontinuity is at a specific point relative to the circumference of the target surface (see e.g., the discontinuity 625 shown in FIGS. 6A and 6B), the noise associated with the passage of the discontinuity will be at a period associated with the speed of rotation.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described embodiments.

Some embodiments described herein, such as for example, the noise reduction methods, relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors.

Although the sensors are shown and described herein as being eddy-current sensors, in other embodiments and suitable sensor can be employed. For example, in some embodiments, any of the sensors described herein can be an optical sensor, a Hall effect sensor, an LVDT or the like.

Although the systems are shown and described herein as being applicable to gas turbine engines, and more particularly, jet engines, in some embodiments, the systems described herein can be applicable to measure the displacement of any rotating shaft.

What is claimed is:

1. An apparatus, comprising:
   a target member configured to be coupled to a shaft, the shaft disposed within an engine housing and configured to rotate about an axis, the target member including a target surface substantially normal to the axis, wherein the target member is configured to be removably coupled to the shaft;
   a sensor configured to produce a signal associated with a distance between a sensor tip and the target surface; and
   a mounting assembly configured to be coupled to the sensor and the engine housing, the mounting assembly configured to adjust the distance.

2. The apparatus of claim 1, wherein:
   the sensor is an eddy current sensor; and
   the target surface is constructed from a conductive material.

3. The apparatus of claim 1, wherein the sensor is a first sensor, the signal is a first signal, the apparatus further comprising:
   a second sensor configured to produce a second signal associated with a distance between a sensor tip of the second sensor and the target surface, the second sensor disposed circumferentially opposite the first sensor.

4. The apparatus of claim 1, wherein the mounting assembly includes a first adjustment portion and a second adjustment portion, the first adjustment portion configured to adjust the distance over a first range, the second adjustment portion configured to adjust the distance over a second range.

5. The apparatus of claim 1, wherein the mounting assembly includes a first adjustment portion and a second adjustment portion, the first adjustment portion configured to be adjustably coupled to the engine housing, the second portion defining a channel within which the sensor is configured to be slidably coupled.

6. The apparatus of claim 1, wherein the mounting assembly includes a first adjustment portion and a second adjustment portion, the first adjustment portion configured to be adjustably mounted within a channel defined by the engine housing, the second portion configured to be adjustably coupled to the sensor.

7. The apparatus of claim 1, wherein the target member includes a first portion, a second portion, the target member configured to moved between an expanded configuration and a collapsed configuration, the second portion is spaced apart from the first portion when the target member is in the expanded configuration, the second portion in contact with the first portion when the target member is in the collapsed configuration.

8. The apparatus of claim 1, wherein the target member has a balance surface opposite the target surface, the balance surface being tapered.

9. An apparatus, comprising:
a target member configured to be coupled to a shaft, the shaft disposed within an engine housing and configured to rotate about an axis, the target member including a target surface and a balance surface, the target surface substantially normal to the axis, the balance surface opposite the target surface, the balance surface being tapered;
a sensor configured to produce a signal associated with a distance between a sensor tip and the target surface; and
a mounting assembly configured to be coupled to the sensor and the engine housing.

10. The apparatus of claim 9, wherein the balance surface includes a balance mass coupled thereto.

11. The apparatus of claim 9, wherein:
the sensor is an eddy current sensor; and
the target surface is constructed from a conductive material.

12. The apparatus of claim 9, wherein the mounting assembly is configured to adjust the distance.

13. The apparatus of claim 9, wherein the mounting assembly includes a first adjustment portion and a second adjustment portion, the first adjustment portion configured to adjust the distance over a first range, the second adjustment portion configured to adjust the distance over a second range.

14. The apparatus of claim 9, wherein the mounting assembly includes a first adjustment portion and a second adjustment portion, the first adjustment portion configured to be adjustably coupled to the engine housing, the second portion defining a channel within which the sensor is configured to be slidably coupled.

15. A method, comprising:
disposing a target member about a shaft of an engine such that a target surface of the target member is substantially normal to an axis of rotation of the shaft, the shaft configured to be disposed within an engine housing;
coupling a sensor to the engine housing, the sensor configured to produce a signal associated with a distance between a sensor tip and the target surface, wherein the coupling includes coupling the sensor to the engine housing via a mounting assembly; and
adjusting a position of the sensor to change the distance, wherein the adjusting includes at least one of moving a first adjustment portion of the mounting assembly within a housing channel defined by the engine housing and moving the sensor within a mounting channel defined by a second adjustment portion of the mounting assembly.

16. The method of claim 15, wherein:
the sensor is an eddy current sensor; and
the target surface is constructed from a conductive material.

17. The method of claim 15, wherein the sensor is a first sensor, the signal is a first signal, the method further comprising:
coupling a second sensor to the engine housing such that the second sensor is disposed circumferentially opposite the first sensor, the second sensor configured to produce a second signal associated with a distance between a sensor tip of the second sensor and the target surface, the second sensor disposed circumferentially opposite the first sensor.

* * * * *